United States Patent

Cummins

[11] 3,982,169
[45] Sept. 21, 1976

[54] EXCITATION SYSTEM FOR A SELF-EXCITED ALTERNATOR

[75] Inventor: Donald L. Cummins, Anderson, Ind.

[73] Assignee: General Motors Corporation, Detroit, Mich.

[22] Filed: Aug. 25, 1975

[21] Appl. No.: 607,199

[52] U.S. Cl. .............................. 322/28; 322/60; 322/73
[51] Int. Cl.² ........................................ H02P 9/08
[58] Field of Search .............. 320/64, 68; 322/20, 322/24, 25, 28, 60, 73

[56] References Cited
UNITED STATES PATENTS

| | | | |
|---|---|---|---|
| 3,470,456 | 9/1969 | Reinert | 322/28 X |
| 3,548,288 | 12/1970 | Wyles | 322/28 |
| 3,611,112 | 10/1971 | Lehinoff | 322/60 |

Primary Examiner—J. D. Miller
Assistant Examiner—Robert J. Hickey
Attorney, Agent, or Firm—Richard G. Stahr

[57] ABSTRACT

A capacitor is connected in circuit with the output windings of an alternator in such a manner that it is charged in a first direction during selected half cycles and in a second direction during the other half cycles of the alternator alternating current output potential. During the selected half cycles, the alternator output potential and the charge upon the capacitor acting in series aiding relationship provides base drive current for a driver transistor to trigger this device conductive through the current carrying electrodes. Upon the conduction of this transistor, base drive current is supplied therethrough to another transistor included in an associated voltage regulator circuit to trigger this device conductive through the current carrying electrodes thereof which completes an energizing circuit for the alternator field winding.

4 Claims, 1 Drawing Figure

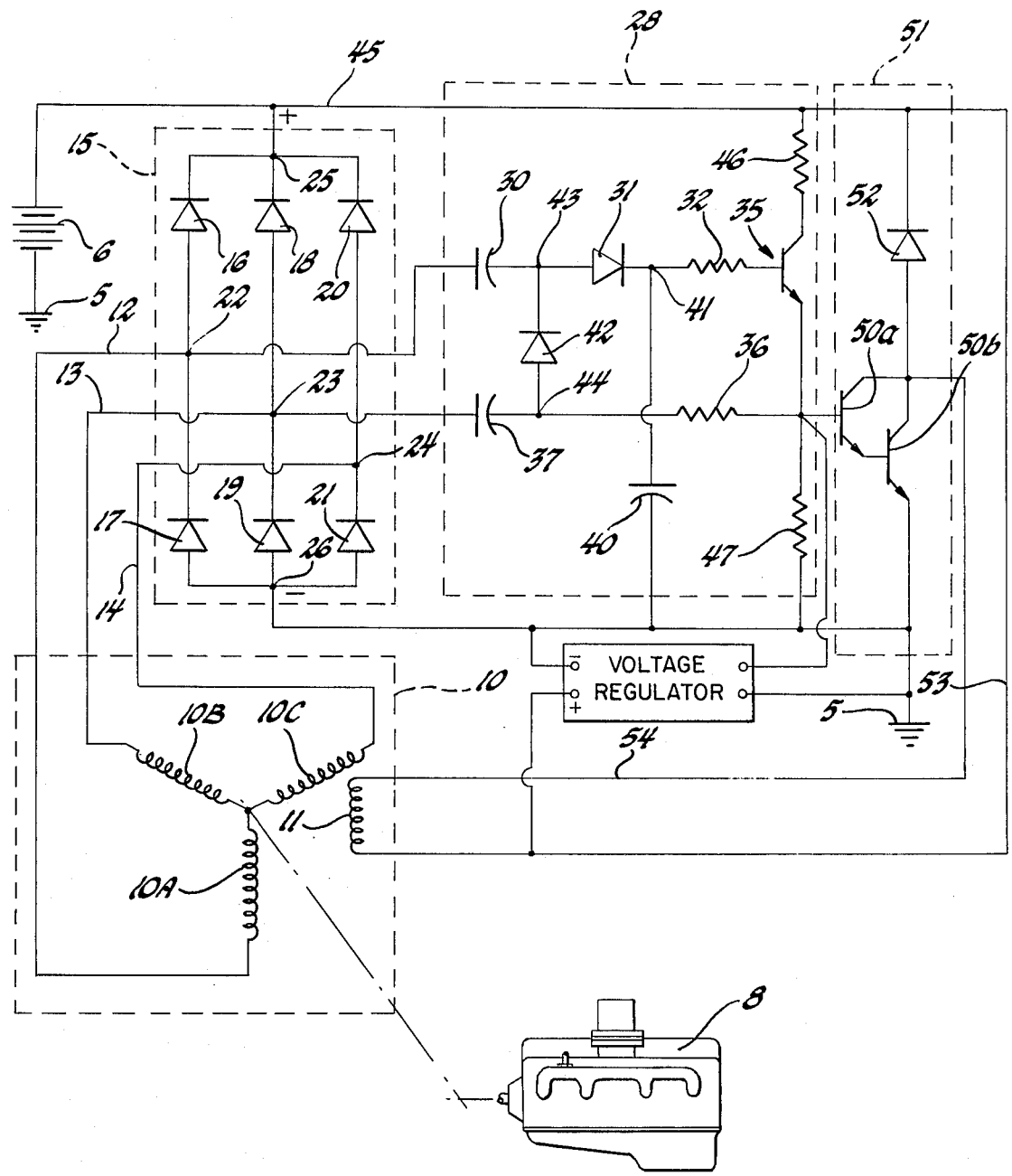

EXCITATION SYSTEM FOR A SELF-EXCITED ALTERNATOR

This invention is directed to an excitation system for a self-excited alternator and, more specifically, to an excitation system of this type which provides for the energization of the alternator field winding at low rotary speeds.

In motorized vehicles, both on and off highway types, the vehicle storage battery charging system includes an alternator driven by the engine, a rectifier circuit for converting the alternator alternating current output potential to a battery charging direct current potential and a potential regulator circuit. Upon the initial startup of the engine, the alternator residual magnetism provides the magnetic flux during alternator output potential buildup. Because the residual magnetism may produce a comparatively weak magnetic flux field, the buildup of alternator output is slow, particularly at the initial low engine speeds. With many applications, the slow buildup of alternator output potential at the low engine speeds subsequent to startup is undesirable.

It is, therefore, an object of this invention to provide an improved excitation system for a self-excited alternator.

It is another object of this invention to provide an improved excitation system of a self-excited alternator which provides for the rapid buildup of alternator output potential at low engine speeds.

In accordance with this invention, an excitation system for a self-excited alternator is provided wherein the charge upon a capacitor and selected half cycles of the alternator output potential are impressed in series aiding relationship across the base-emitter electrodes of a driver transistor to trigger this device conductive through the current carrying electrodes thereof to supply base drive current to the alternator field winding energizing circuit switching transistor included in an associated voltage regulator circuit.

For a better understanding of the present invention together with additional objects, advantages and features thereof, reference is made to the following description and accompanying single FIGURE drawing which sets forth the excitation system for a self-excited alternator of this invention in schematic form.

As point of reference or ground potential is the same point electrically throughout the system, it has been illustrated in the drawing by the accepted schematic symbol and referenced by the numeral 5.

Referring to the drawing, the self-excited alternator is schematically set forth within dashed rectangle 10 and includes three-phase, wye-connected output windings 10A, 10B and 10C and a field winding 11 positioned in operative relationship with the output windings. The rotor of alternator 10 is revolved by engine 8 in a manner well known in the motorized vehicle art. The alternator 10 alternating current output potential generated in output windings 10A, 10B and 10C when the rotor of alternator 10 is rotated by engine 8 is full-wave rectified by a three-phase, six diode full-wave rectifier circuit 15 to provide a direct current system output potential for charging battery 6 and for providing an operating potential for other direct current loads. Rectifier circuit 15 includes three positive polarity bank diodes 16, 18 and 20, three negative polarity bank diodes 17, 19 and 21, alternating current input circuitry, illustrated as terminals 22, 23 and 24, interconnected to respective output windings 10A, 10B and 10C of alternator 10 through respective leads 12, 13 and 14 and positive and negative polarity output terminals 25 and 26, respectively. Although a three-phase six diode bridge type full-wave rectifier circuit has been illustrated in the drawing, it is to be specifically understood that the excitation system of this invention may be employed with other type rectifier circuits.

The improved excitation system for self-excited alternators of this invention is set forth schematically within dashed line rectangle 28 of the drawing. Briefly, capacitor 30 is connected in circuit with alternator output windings 10A, 10B and 10C in such a manner that it is charged in a first direction during selected half cycles and in a second direction during the other half cycles of a selected phase of the alternator alternating current output potential. The charge upon capacitor 30 and the potential of the selected half cycles of the selected phase of the output potential of alternator 10 are impressed in series aiding relationship across the base-emitter electrodes of NPN driver transistor 35 in the proper polarity relationship to supply base drive current thereto when the combined potentials reach a magnitude great enough to break down the base-emitter junction of NPN transistor 35. Upon the supply of base drive current through transistor 35, this device is triggered conductive through the current carrying electrodes thereof. Conducting driver transistor 35 supplies base drive current to the NPN transistors 50a and 50b Darlington pair transistor switching arrangement to trigger these devices conductive through the current carrying electrodes thereof and complete an energizing circuit for alternator field winding 11. Although the transistor switching arrangement for completing an energizing circuit for alternator field winding 11 is illustrated in the drawing as an NPN transistor Darlington pair, it is to be specifically understood that any transistor switching arrangement effective, when in the electrical circuit closed condition, to complete an energizing circuit for alternator field winding 11 may be employed.

A capacitor 30, a diode 31, a current limiting resistor 32, the base-emitter electrodes of NPN transistor 35, current limiting resistor 36 and capacitor 37 are connected in series across terminals 22 and 23, respectively, of rectifier circuit 15. The phase to phase output potential of output windings 10A and 10B of alternator 10 appear across terminals 22 and 23 of rectifier circuit 15. A capacitor 40 is connected across junction 41 between diode 31 and resistor 32 to the negative polarity output terminal of rectifier circuit 15 and diode 42 is connected across junction 43 between capacitor 30 and diode 31 and junction 44 between capacitor 37 and resistor 36. Driver NPN transistor 35 has the collector-emitter electrodes thereof connected across positive polarity potential lead 45 and point of reference or ground potential 5 through collector resistor 46 and emitter resistor 47, respectively. The collector-emitter electrodes of NPN transistor 35, therefore, are connected across battery 6 in the proper polarity relationship for forward collector-emitter conduction therethrough.

The energizing circuit for field winding 11 of alternator 10 is established across the output terminals 25 and 26 of rectifier circuit 15 through the alternator field switching transistor of an associated voltage regulator circuit. As the regulator circuit per se forms no part of this invention, in the interest of reducing drawing complexity, only the alternator field winding switching transistor is illustrated in the drawing within dashed rectangle 51. The switching transistor is shown to be an NPN transistor Darlington pair 50a and 50b. Diode 52 is the conventional free-wheeling diode connected across alternator field winding 12.

Upon the initial startup of engine 8, an alternating current output potential is induced in output windings 10A, 10B and 10C of alternator 10 due to the residual magnetism of the alternator, as is well known in the art. When the phase to phase potential across output windings 10A and 10B of alternator 10 is of a positive polarity upon terminal 22 with respect to terminal 23, capacitors 30 and 40 become charged through a charge circuit which may be traced from terminal 22 of rectifier circuit 15, through capacitor 30, diode 31, capacitor 40 and point of reference or ground potential 5 to the negative polarity direct current output terminal 26 of rectifier circuit 15. When the phase to phase potential of alternator output windings 10A and 10B reverses in polarity with the potential upon terminal 23 of rectifier circuit 15 being of a positive polarity with respect to terminal 22, capacitor 30 is charged in the opposite direction through a circuit which may be traced from terminal 23, through capacitor 37, diode 42 and capacitor 30 to terminal 22. Successive cycles add the alternator output voltage to the charge upon capacitor 30 in a series aiding relationship when the phase to phase output potential of output windings 10A and 10B is of a positive polarity upon terminal 22 of rectifier circuit 15. This total potential is applied across the base-emitter electrodes of driver transistor 35 in the proper polarity relationship to produce base drive current through an NPN transistor, consequently, as the potential across the base-emitter junction of NPN driver transistor 35 increases to the point at which base-emitter drive current is supplied thereto, this device is triggered conductive through the collector-emitter electrodes to supply base-emitter drive current to the voltage regulator alternator field winding energizing circuit switching transistor arrangement to trigger transistors 50a and 50b conductive through the current carrying electrodes thereof. Upon the conduction of these transistors, an energizing circuit is completed for field winding 11 of alternator 10 through a circuit which may be traced from the positive polarity direct current output terminal 25 of rectifier circuit 15, through positive polarity potential line 45, lead 53, alternator field winding 11, lead 54, the current carrying electrodes of the voltage regulator alternator field winding energizing circuit switching transistors 50a and 50b and point of reference or ground potential 5 to the negative polarity direct current output terminal 26 of rectifier circuit 15. Upon the completion of this energizing circuit, the alternator 10 generates an output potential in the normal manner.

The charge upon capacitor 40 maintains base drive current through driver NPN transistor 35 during the half cycles of output windings 10A and 10B interphase voltage when the potential upon terminal 23 of rectifier circuit 15 is of a positive polarity with respect to terminal 22; diode 31 prevents the discharge of capacitor 40 through capacitor 30 during these half cycles, diode 42 prevents capacitor 30 from discharging through capacitor 37 during the opposite half cycles and capacitor 37 prevents driver transistor 35 from being biased off during the half cycles of the output windings 10A and 10B interphase voltage when the potential upon terminal 22 is of a positive polarity with respect to terminal 23.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An excitation system for a self-excited alternator having a field winding positioned in operative relationship with the output windings thereof comprising in combination with a potential regulator circuit of the type including a transistor switching arrangement effective, when in the electrical circuit closed condition to complete an energizing circuit for the alternator field winding: a capacitor connected in circuit with said alternator output windings in such a manner that it is charged in a first direction during selected half cycles and in a second direction during the other half cycles of a selected phase of the alternator alternating current output potential; and means responsive to the charge upon said capacitor and the potential of said selected half cycles of said alternator output potential acting in series aiding relationship for triggering said transistor switching arrangement to the electrical circuit closed condition to complete an energizing circuit for said alternator field winding.

2. An excitation system for a self-excited alternator having a field winding positioned in operative relationship with the output windings thereof comprising in combination with a potential regulator circuit of the type including a transistor switching arrangement effective, when in the electrical circuit closed condition to complete an energizing circuit for the alternator field winding: a first capacitor connected in circuit with said alternator output windings in such a manner that it is charged in a first direction during selected half cycles and in a second direction during the other half cycles of a selected phase of the alternator alternating current output potential; means responsive to the charge upon said capacitor and the potential of said selected half cycles of said alternator output potential acting in series aiding relationship for triggering said transistor switching arrangement to the electrical circuit closed condition to complete an energizing circuit for said alternator field winding; and a second capacitor effective to maintain said transistor switching arrangement in the electrical circuit closed condition during the other half cycles of the selected phase of said alternator alternating current output potential.

3. An excitation system for a self-excited alternator having a field winding positioned in operative relationship with the output windings thereof comprising in combination with a potential regulator circuit of the type including a transistor switching arrangement effective, when in the electrical circuit closed condition to complete an energizing circuit for the alternator field winding: a capacitor connected in circuit with said alternator output windings in such a manner that it is charged in a first direction during selected half cycles and in a second direction during the other half cycles of a selected phase of the alternator alternating current output potential; and means responsive to the charge upon said capacitor and the potential of said selected half cycles of said alternator output potential acting in series aiding relationship for supplying control electrode drive current to the transistor switching arrangement whereby said transistor switching arrangement is operated to the electrical circuit closed condition to complete an energizing circuit for said alternator field winding.

4. An excitation system for a self-excited alternator having a field winding positioned in operative relationship with the output windings thereof comprising in combination with a potential regulator circuit of the type including a transistor switching arrangement effective, when in the electrical circuit closed condition to complete an energizing circuit for the alternator field winding: a capacitor connected in circuit with said alternator output windings in such a manner that it is charged in a first direction during selected half cycles and in a second direction during the other half cycles of a selected phase of the alternator alternating current output potential; a driver transistor having base, collector and emitter electrodes; means for impressing the charge upon said capacitor and the potential of said selected half cycles of said alternator output potential acting in series aiding relationship across said base-emitter electrodes of said driver transistor for triggering said drive transistor conductive through said collector-emitter electrodes thereof; and a transistor switching arrangement operated to the electrical circuit closed condition in response to conduction through said driver transistor for completing an energizing circuit for said alternator field winding.

* * * * *